United States Patent
Jackson et al.

(10) Patent No.: US 9,919,219 B2
(45) Date of Patent: Mar. 20, 2018

(54) MUSIC BASED VIDEO GAME WITH USER-GENERATED CONTENT

(71) Applicants: Jamie Jackson, Leamington Spa (GB);
Dave Osbourn, Leamington Spa (GB);
Neil Wigfield, Leamington Spa (GB);
Chris Coates, Leamington Spa (GB);
Paul Turland, Leamington Spa (GB);
Pete O'Donnell, Leamington Spa (GB);
James Norris, Leamington Spa (GB);
Lee Roberts, Leamington Spa (GB)

(72) Inventors: Jamie Jackson, Leamington Spa (GB);
Dave Osbourn, Leamington Spa (GB);
Neil Wigfield, Leamington Spa (GB);
Chris Coates, Leamington Spa (GB);
Paul Turland, Leamington Spa (GB);
Pete O'Donnell, Leamington Spa (GB);
James Norris, Leamington Spa (GB);
Lee Roberts, Leamington Spa (GB)

(73) Assignee: Activision Publishing, Inc., Santa Monica, CA (US)

( * ) Notice: Subject to any disclaimer, the term of this patent is extended or adjusted under 35 U.S.C. 154(b) by 518 days.

(21) Appl. No.: 14/520,109

(22) Filed: Oct. 21, 2014

(65) Prior Publication Data
US 2016/0107088 A1    Apr. 21, 2016

(51) Int. Cl.
*A63F 13/792* (2014.01)
*A63F 13/63* (2014.01)
*A63F 13/69* (2014.01)
*A63F 13/814* (2014.01)
*A63F 13/60* (2014.01)
*A63F 13/61* (2014.01)

(52) U.S. Cl.
CPC ............ *A63F 13/792* (2014.09); *A63F 13/60* (2014.09); *A63F 13/61* (2014.09); *A63F 13/63* (2014.09); *A63F 13/69* (2014.09); *A63F 13/814* (2014.09)

(58) Field of Classification Search
None
See application file for complete search history.

(56) References Cited

PUBLICATIONS

"Rock Band Network". From Wikipedia, The Free Encylopedia. [online], [retrieved on Mar. 18, 2017]. Retrieved from the Internet <URL:https://en.wikipedia.org/w/index.php?title=Rock_Band_Network&oldid=626243269>. 7 pages.*
"Guitar Hero World Tour". From Wikipedia, The Free Encylopedia. [online], [retrieved on Mar. 18, 2017]. Retrieved from the Internet <URL:https://en.wikipedia.org/w/index.php?title=Guitar_Hero_World_Tour&oldid=625486162>. 12 pages.*

* cited by examiner

*Primary Examiner* — Lawrence Galka
(74) *Attorney, Agent, or Firm* — Klein, O'Neil & Singh, LLP

(57) ABSTRACT

A video game includes user generated content. The video game may be a music-based video game. Users may determine content to be played, and a server may provide the content to game devices for play, for example at predefined times, and/or to predetermined game players.

6 Claims, 12 Drawing Sheets

MUSIC BASED VIDEO GAME WITH USER-GENERATED CONTENT

BACKGROUND OF THE INVENTION

The present invention relates to video games, and more particularly to video games with user generated content.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy, at least for a particular game player.

In many cases, playing of video games can be a solitary experience, with for example a single game player playing a video game, on their own, engaged with rendered graphics, which perhaps are meant to simulate a real world experience. In some cases, multi-player video game play may be possible, either at a single location or in a networked manner. Both allow for a degree of interaction between game players, but in both cases there may be obstacles or delays in entering into game play. For single location multi-player game play there needs to be multiple game players at the location, and interaction may be limited to those game players. For networked multi-player game play, a game player may need to go through some matchmaking process to be matched with other players, have to wait in a game lobby, etc.

Game players may also tend towards playing a particular single game play pattern of a particular game, perhaps repeatedly, and perhaps to the exclusion of other game play patterns, which may broaden experiences of the game player. A game player may in fact prefer play of a particular game play pattern over all others. In some cases, however, the game player may merely not know of the opportunities presented by other game play patterns. Those game play patterns may be ones that other game players have already explored and appreciated, and that the game player would also enjoy, if only the game play pattern could be properly introduced to the game player.

BRIEF SUMMARY OF THE INVENTION

Aspects of the invention relate to video games. One aspect of the invention provides a method for providing a user-generated video game program in a music-based video game, comprising: receiving information from a user; processing the received information to create a video game program based on the received information; determining that the created video game program may be transmitted to a plurality of game devices; wherein the determining that the created video game program may be transmitted to a plurality of game devices is based on receipt of a payment from the user.

These and other aspects of the invention are more fully comprehended upon review of this disclosure.

DETAILED DESCRIPTION

Figure 1:
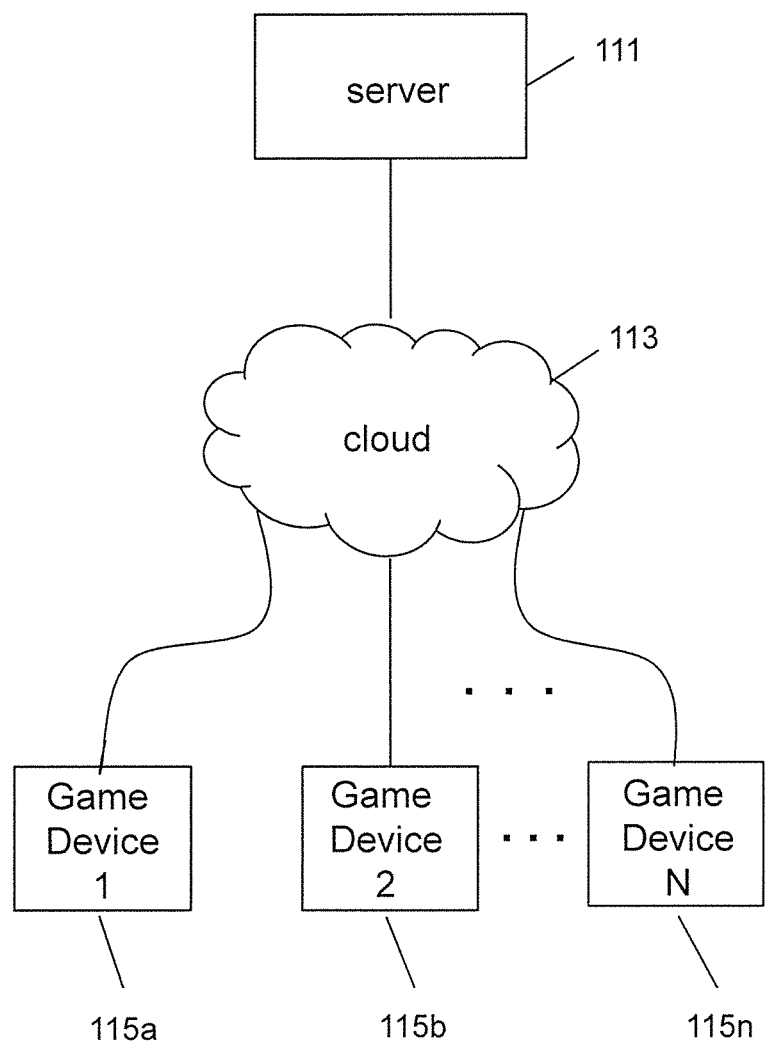
FIG. 1 is a block diagram of a system in accordance with aspects of the invention.

FIG. 1 is a block diagram of a system in accordance with aspects of the invention. In FIG. 1, a server 111 transmits video game content over a network 113 to a plurality of game devices 115a-n, to allow for video game play by users using the game devices. In most embodiments, the game devices transmit a request over the network to the server for the video game content, and in some embodiments, the game devices also transmit information relating to the users and/or game play.

In some embodiments, the server may include multiple servers. For example, in some embodiments, the server 111 may be effectively implemented using a plurality of servers forming a content distribution network, and in some embodiments, an origin server may store the content and replicate or cache the content on one or more content delivery network's content servers. Further, in some embodiments, content may be replicated on some or all of game devices 115a-n and distributed using peer-to-peer technologies and/or protocols, and in some embodiments, a hybrid model utilizing both content servers and peer-to-peer technologies may be utilized.

The game devices may be one or more of various computing devices suitable for playing video games. In some embodiments, a game device may be a traditional video game console such as a Microsoft Xbox, Sony PlayStation, Nintendo Wii, or similar device. In other embodiments, a game device instead or in addition may be a personal computer running any of a variety of known operating systems (e.g., Microsoft Windows, Mac OS, UNIX, Linux, etc.). In some embodiments, a game device may be a handheld or portable device capable of playing video games, such as a mobile PC, laptop, tablet, mobile gaming device, smart phone, or mobile phone. The handheld or portable device may include similar or internal circuitry to the game consoles and/or personal computer (e.g. one or more processors and interface circuitry), as well as, for example, one or more displays, which may be a built-in display or a projected display, and various different user input controllers.

In some embodiments, the video game is a music-based video game. In such embodiments, the video game content may comprise audio information of a song, visual information for display during play of the song, and song instructive cue information for providing instructions to a user for manipulation of a game controller or other input device. In some embodiments, the video game content may include such information for a plurality of songs, with the songs presented for play in a serial fashion. In some embodiments, the songs are for play during a predefined time period, for example a particular half hour or hour period, with presentation of the songs for play perhaps interspersed by advertisements, or in some embodiments, with advertisements displayed simultaneously with the presentation of the songs (e.g., the advertisements displayed in a portion of the display during presentation of a particular song). In some such embodiments, the song information may be transmitted from the server in a streaming fashion during the time period, and in other such embodiments, the song information may be transmitted before or before and during the time period, such that all or a significant portion of the song information is provided to game devices prior to beginning of the time period.

In some embodiments, a series of songs presented for play during a time period may be considered a program, and the server may make a plurality of different programs available during the same period, with for example the different programs each being considered as being presented on a different channel. In some embodiments, a program may comprise songs that are related in some manner, for example by genre, artist, time period, popularity, inclusion on a particular ranking or chart (top 40, Billboard, etc.), or some other manner. A game device, operated by a user, generally may request transmission of any program of a plurality of programs from any of a plurality of channels.

In some embodiments, users may purchase or otherwise earn the ability to consume all or a subset of the available video game content. In music-based video game embodiments, the user may be able to purchase or earn, for example, the ability to play certain songs and/or programs. The video game content may be purchased using real or virtual currencies. For example, in addition or in the alternative to allowing the user to use real currency to purchase video game content, access to the video game content may be earned as the user progresses through the video game (e.g., access may be a purchased through gained experience, earned virtual currency, and/or as a function of the user's level or progress through the game).

In some embodiments, the user may purchase or earn the ability to access all or some subset of the available video game content. In some embodiments, the access may be for a limited duration (e.g., a certain number of days, weeks, months, etc.). In some embodiments, for example in embodiments in which video game content is generally transmitted at predetermined times, the user may purchase or earn the ability to access all or a subset of the video game content during times periods outside scheduled transmission times. In some embodiments, the user may purchase or earn the ability to permanently access video game content. In the context of a music-based video game, the user may purchase a song and/or program for permanent inclusion in the user's song and/or program library.

In some embodiments, the purchased access may be related to some particular subset of video game content. In the context of a music-based video game, for example, the user may purchase access to songs and/or programs relating to one or more genres of music, artists, time periods, top 40 songs or other music rankings, venues, music festivals, etc.

In some embodiments, access is purchased using an on-screen interface, for example with the user selecting and/or entering information using an input device, with the game device transmitting information relating to the purchase to the server.

In some embodiments, the server may transmit advertisements in addition to video game content. Advertisements transmitted by the server may interrupt presentation of the video game content. In the example of a music-based video game, an advertisement may interrupt the presentation of a song and/or program, be displayed simultaneously with the presentation of a song and/or program, and/or be interspersed between presentation of songs and/or programs. In some such embodiments, some or all of the advertisements may include music of the song being played prior to commencement of the advertisement or alternatively music of a song particular to the advertisement, and the server may also transmit instructive cue information related to music in the advertisement. In some embodiments, a user may elect to continue play of the song being played prior to commencement of the advertisement, or select to instead play music of the song particular to the advertisement.

In some embodiments, songs transmitted by the server during a particular time period of a program may be based on a list of songs received by the server from one of the game devices. For example, a user, using the game device, may provide a list of songs for presentation during a particular time period (e.g., a user-generated program), with the server later transmitting those songs, for play during that time period. In some embodiments, the user may only be allowed to provide the list of songs if the user meets some predefined criteria, for example reaching certain video play goals or making a particular payment. For example, in some embodiments, the user may only be allowed provide the list of songs if the user has purchased each of the songs in the list. Additionally or alternatively, the user may only be allowed to provide the list of songs if the user has purchased the ability to provide the list of songs. In some embodiments, the user may determine the number and/or identity of other users that may view his or her user-generated program, and provide that information, for example using the game device, to the server. For example, the user creating the program may specify that only the user's friends may view the user-generated program. Additionally or alternatively, the server may require a particular payment from the user to allow other users to view his or her broadcast (e.g., specific payments for x, y, z number of viewers).

In some embodiments, the server provides to a user a guide comprising scheduling information relating to programs, songs, and/or other video game content. In some embodiments, the server allows a user to view and/or access all or a subset of available video game content. In some embodiments, the server provides a virtual storefront from which a user may view and/or purchase virtual goods, programs, songs, and/or other video game content. In some embodiments, the server makes certain virtual goods, programs, songs, and/or other video game content only available to a subset of users, for example those that have obtained a certain achievement, reached a certain experience level, played a certain amount of hours, purchased certain goods and/or virtual currency, etc. In some embodiments, the server awards bonuses to users who log into the system (e.g., a daily, weekly, or monthly bonus).

Figure 12:
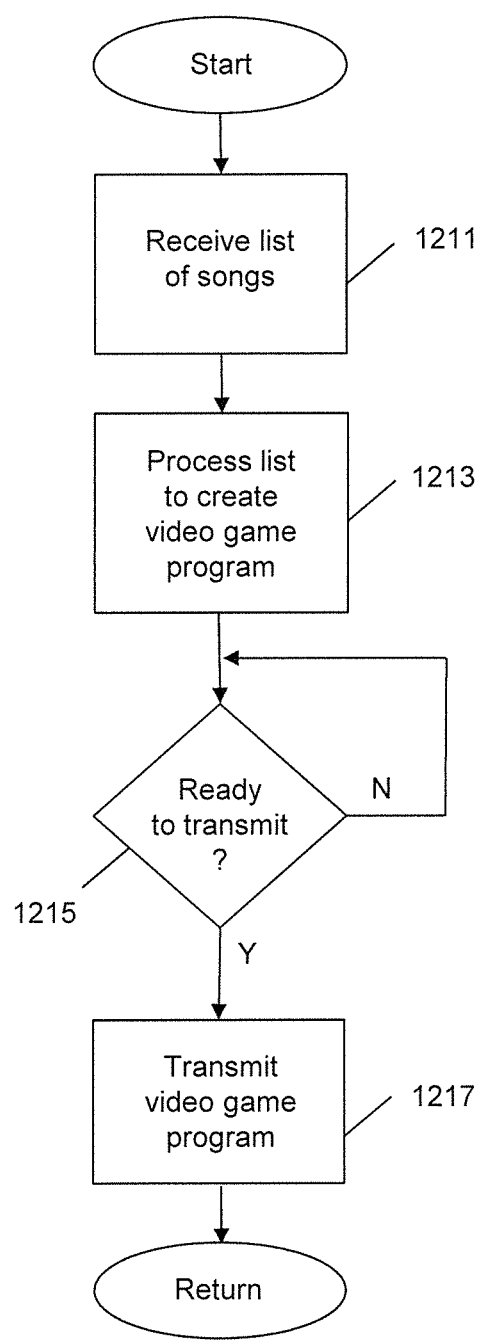
FIG. 12 is a flowchart of a process for providing a user-generated video game program.

FIG. 12 is a flowchart of a process for providing a user-generated video game program in a music-based video game in accordance with aspects of the invention. In some embodiments, the process is performed by a server, for example the server as discussed with respect to FIG. 1.

In block 1211, the process receives a list of songs. In some embodiments, the list of songs is generated by a user. In some embodiments, the list of songs is received, over a network, from a game device, and/or, in some embodiments, from some other computer device of or associated with the user. In some embodiments, songs on the list of songs are limited to selections available from a predetermined set of songs. The predetermined set of songs may be stored on or determined by the server, for example, and the server may transmit information identifying the predetermined set of songs which may be selected to the user's game device or other computer device. Further, in some embodiments the list of songs in addition or instead is constrained such that total play time of songs on the list of songs do not exceed a predetermined maximum amount of time.

In block 1213, the process processes the list of songs to create a video game program. In some embodiments, the video game program includes a series of songs for play, with the songs for play including audio of the song, video associated with the song, and instructive cues associated with the song. In some embodiments, the list of songs is an ordered sequential list of songs, and the process queues, or effectively queues, music-based video game content incorporating the songs for transmission. In some embodiments, the process additionally determines advertisements to be included for transmission with the songs for play, and/or between transmission of the songs for play.

In block 1215, the process determines if the video game program is ready for transmission to game devices. In some embodiments, the video game program is ready for transmission to game devices when a predetermined time is reached. The predetermined time may be, for example, a scheduled time, for example a time requested or scheduled by the user, or otherwise scheduled. In addition or instead, in some embodiments the video game program is ready for transmission to game devices after receipt of payment from the user.

In block 1217, the process transmits the video game program to game devices. In some embodiments, the process transmits the video game program to predetermined game devices, which may be game devices associated with predetermined users. In some embodiments, the process transmits the video game program to game devices from which a request for the video game program was received. In some embodiments, the process transmits the video game program to only a predetermined number of game devices.

The process thereafter returns.

In embodiments relating to user-created programs, the user may be provided with information relating to the consumption of his or her program. For example, the server may provide the user, by way of providing information to the game device, with usage statistics relating to his or her program, scores or other indicators of performance relating to his or her program, comments or messages relating to his or her program, etc. In some embodiments, usage statistics for user-created programs may be collected, for example by the server, and published to one or more users of the video game. For example, the user-created programs with the most plays or most positive comments may be published in a leaderboard. As another example, user-created programs may be categorized and searchable based on content (e.g., genre, time period, artist, venue, etc.), game type, user, etc. In some embodiments, users may be awarded bonuses or other in-game benefits based on the consumption of his or her program. For example, users with programs generating more than a certain threshold of views or plays may be awarded with additional in-game items and/or virtual currency.

In various embodiments, the server also transmits information regarding game players participating in game play for a given program (whether user-created or not). For example, in various embodiments the server receives from the game devices information regarding users participating in game play, such as a user identifier, an indication of user game play performance, user location, and/or other information. In some such embodiments, the server may generate information indicating relative user performance during game play and/or general user locations. For example, the server may generate a ranking of game players participating in game play of a program and/or of past game player performances. In some embodiments, the ranking may be filtered for particular game devices to show only particular previously identified users, for example other users on a friends list of a particular user. Also for example, the server may generate a presentation, for example a map, indicating general locations of users participating in game play of a program. The presentation may indicate the locations and numbers of participating users in various regions, for example by state, country, or geographic region. In some embodiments, the indication of a user's game play performance may comprise information sufficient to reproduce the user's performance on another user's game device. In such embodiments, one user may view and/or compete against another user's performance.

Figure 2:
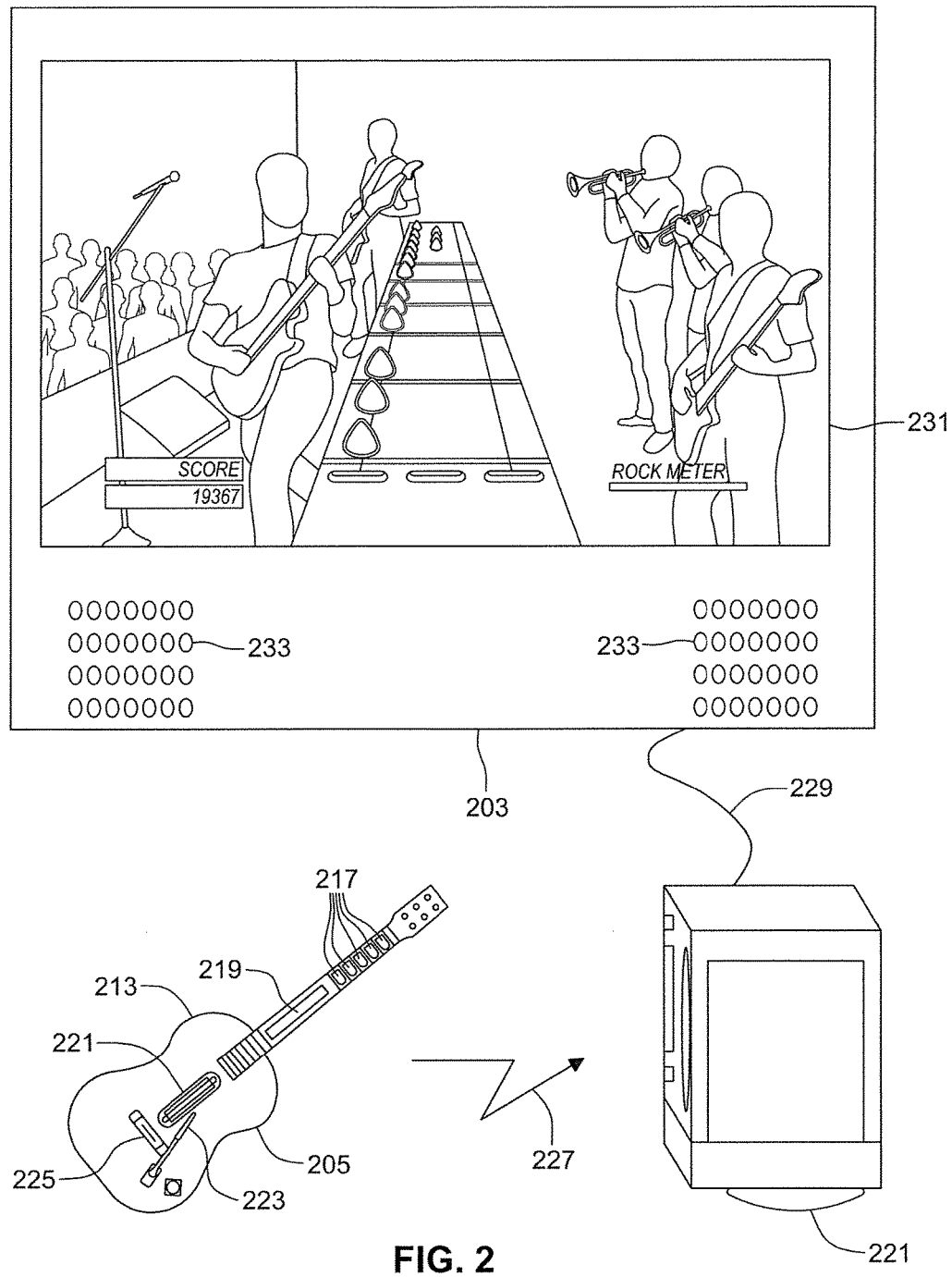
FIG. 2 shows a game device in accordance with aspects of the invention.

FIG. 2 shows a game device in accordance with aspects of the invention. The game device of FIG. 2 includes a video game console 201, a display 203, and a controller 205. The video game console includes internal circuitry that allows the console to run a video game by executing various program instructions related to proper execution of the video game. The video game console typically includes one or more processors, memory, and various interface circuitries, for example interface circuitry for coupling to a network.

Instructions providing for operation during game play are generally stored on removable media, for example, an optical disk. Accordingly, the game console may include an optical drive, for example, a DVD-ROM, CD-ROM, Blu-ray drive, or similar device, for reading the instructions for operating during game play. In some embodiments, the removable media may be a flash memory data storage device. In other embodiments, the instructions providing for operation during game play may be stored in a remote server that is accessed over one or more networks. In yet other embodiments, the instructions providing for operation during game play may be stored on the local memory of the video game console.

The video game console of FIG. 2 is coupled to the controller by a wireless connection 227. In many embodiments, the controller and video game console may be coupled by a wired connection. In addition, the controller illustrated in FIG. 2 is in the shape of a guitar. In various embodiments, other controllers may instead or additionally be used, including generic controllers, microphones, drums, drumsticks, keyboards, DJ turntables, dance pads or mats, other guitar-shaped controllers, or controllers in the general form of other musical instruments.

As mentioned, in FIG. 2, the game controller 205 is in the form of a guitar-shaped controller 205. In some such embodiments, the controller 205 comprises a body 213 and neck 215. Controller 205 may further comprise various input buttons that permit the user to interact with the video game console, such as strum bar 221, whammy bar 223, fret buttons 217, neck input 219, and controller buttons 225.

In some embodiments, controller 205 may also comprise one or more motion sensing devices, which determine the motion of the controller and/or user, and allow the user to interact with the video game console using physical movements. Motion sensing devices may include, for example, one or more gyroscopes, accelerometers, altimeters, geomagnetic sensors, magnetometers, optical or infrared projectors and transceivers, depth-sensing cameras, global positioning systems, thermal imaging systems, or any other similar device that generates signals provided to the video game console from which the video game console can determine motion of the controller and/or user. In some embodiments, the motion sensing device may be worn by the user. As used herein, the term "motion" is used broadly to encompass motion, position, posture, orientation, and location. Examples of systems incorporating exemplary motion sensing devices include the Nintendo Wii and Wii U, Sony PlayStation Move, and Microsoft Kinect platforms.

The video game console is in communication with a display unit 203, generally through an audio-video cable or similar wired connection, although a wireless connection may be used in some embodiments. Display unit 203 is generally some television or monitor. In many embodiments, the display unit 203 is a liquid crystal display (LCD), light-emitting diode (LED) display, or some other flat-panel display. In some embodiments, the display unit 203 is integrated with the video game console. The display unit generally comprises a display screen 231 and at least one audio output device, such as a speaker 233. In the embodiment of FIG. 2, the display screen shows a screen shot of video game play in a music-based video game.

In the particular screenshot of FIG. 2, the display includes a plurality of instructive cues 241. The instructive cues generally scroll across portions of the screen towards and into a predefined area of the screen, such as the NOW area 243. Although the screenshot of FIG. 2 shows the instructive cues scrolling in a substantially vertical direction, the instructive cues may scroll in any direction or along an arbitrary path. The display also shows a game scene, in this case a music concert scene, viewed from the viewpoint of an in-game performer representative of the game player. The music concert scene may be considered a scene of a music concert game world, with the game world including a crowd of people providing an audience for a musical performance. The viewpoint of the in-game performer may be considered a point of view in the game world, to be used in determining the game scene to be displayed (i.e., a first-person viewpoint). In some embodiments, the display may show one or more video game characters as in-game performers representative of one or more game players (i.e., a third-person viewpoint).

During video game play, a user is to depress or have depressed various buttons and/or utilize a strum bar or other user manipulable input device of the controller responsive to the instructive cues, generally when the instructive cues reach a predefined area of the display such as the NOW area 243. In most embodiments, the video game console evaluates the user's performance based on the extent of the user's compliance with the operations commanded by the instructive cues. In addition, the video game console generally commands presentation of audio during video game play. In most embodiments, audio of a musical selection is provided if the user complies with the instructive cues, and silence, which in some embodiments, may be a lack of audio of part of the musical selection, or a sound associated with a missed note may be provided if the user does not comply with the instructive cues. Whether silence or a sound associated with a missed note is provided may depend, for example, on whether the user operates incorrect input commands or does not operate any input device. In various embodiments the presentation of audio may also include audio from a crowd of the game world, with for example the crowd being an audience for a musical performance.

Figure 3:
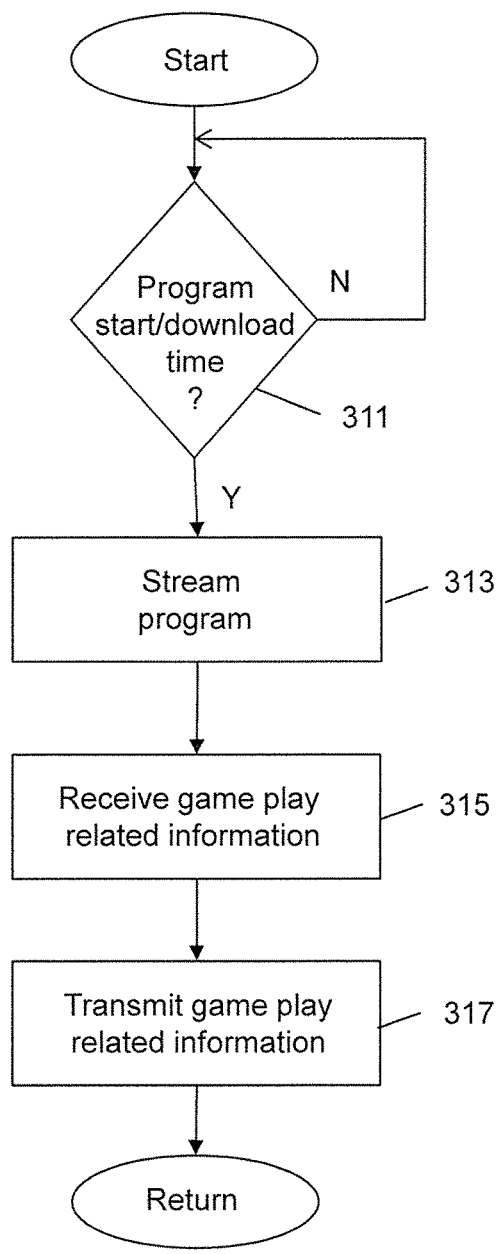
FIG. 3 is a flowchart of a process for providing game play content in accordance with aspects of the invention.

FIG. 3 is a flowchart of a process for transmitting program information from a server to game devices in accordance with aspects of the invention. In some embodiments, the program information comprises video game content for a music-based video game. In some embodiments, the program information additionally comprises advertisements and/or user game play related information. In some embodiments, the process is performed by a server, for example a server as discussed with respect to FIG. 1.

In block 311, the process determines if a program start time and/or a download start time has been reached. In some embodiments, the video game content is streamed to game devices during a predefined time period during which video game play is to occur. In such embodiments, the program start time and the download start time may be the same or substantially the same. In some embodiments, the video game content is streamed, or transmitted, to game devices beginning at a time before the program start time, in which case the download time may precede the program start time.

The video game content, using a music-based video game as an example, may comprise audio of a song, video for presentation with the song, and instructive cue information indicating desired user operation of a game controller and/or desired vocal input. In some embodiments, the video game content may additionally include advertisement information and/or other information.

If the program start time and/or download start time has been reached, in block 313 the process transmits the video game content to game devices. In many embodiments, the process transmits the video game content to game devices that have requested the video game content. In various embodiments, the process may also, during a program time period, transmit video game content to game devices that request the video game content during a program time period. In such cases, the process may transmit video game content for the entire program to newly requesting game devices, with the game devices operable to only present for play songs then scheduled for play at that time. Alternatively, in some cases, the process may instead only transmit video game content for unexpired or unplayed portions of the program.

In block 315, the process receives game play related information from the game devices. The game play related information may be, for example, user scores, game play scores, or other indicators of user compliance with instructive cues of the video game content. In some embodiments, the process receives game play related information at a conclusion of a program time period. In some embodiments, the process receives game play related information at the conclusion of each song of a plurality of songs in a program. In many embodiments, however, the process receives game play related information at predefined checkpoints during the program. For example, each song of a program may have a plurality of such predefined checkpoints. In some embodiments, the predefined checkpoints are indicated to game devices by flags in the video game content.

In block 317, the process transmits processed game play related information to the game devices. The processed game play related information may comprise, for example, an indication of how well a user is playing the video game as compared to other users generally, other users playing similarly well, or other users identified as being linked to a particular user.

The process thereafter returns.

Figure 4:
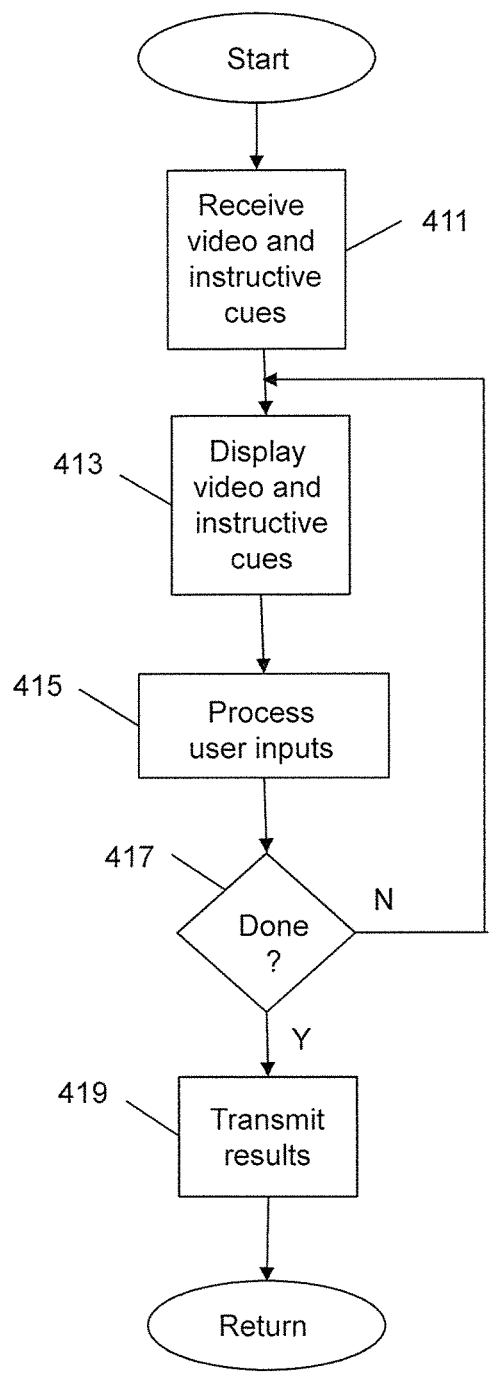
FIG. 4 is a flowchart of an example process for providing game play in accordance with aspects of the invention.

FIG. 4 is a flowchart of an embodiment of a process for providing game play of a music-based video game in accordance with aspects of the invention. In some embodiments, the process is performed by the game device of FIG. 1, or a processor of the game device. Program instructions for the process may be stored on an optical disc or another computer-readable medium. Although the process is described in the context of a music-based video game, one of ordinary skill will recognize that the teachings of the process may be applied to other video game genres in which gameplay instructions are delivered and user inputs received in a continuous loop until the gameplay instructions are completed.

In block 411, the process begins with the game device receiving audio and video for a song, and instructive cues for the song. The video and instructive cues can be received by the game device from internal sources such as the video game cartridge, video game disc, other computer readable medium, or through outside sources such as from a server, wired or wirelessly. The instructive cues are generally designed to elicit user response and input. The process then continues to block 413.

In block 413, video and instructive cues are displayed through a display device such as a monitor, television, or video projector, generally coupled to or part of the game device. In some embodiments, the video and instructive cues provide a user with instructions of actions to be performed on a controller such as, for example, a guitar controller. Additionally or alternatively, the video and instructive cues provide a user with instructions for a vocal performance to be received, of example, through a microphone. In embodiments relating with video and instructive cues with instructions of actions to be performed on a controller, gems can, for example, be displayed to indicate a specific key or a sequence of actions that are to be performed on the guitar controller, the actions to be performed when the gems are in a particular display area. Expected user actions may be based on the colors, shapes, and positions of the gems. In one embodiment, the gems initially appear in an upper portion of a display screen and move generally toward a lower portion of the display screen on a music track. A horizontal NOW bar is displayed in the lower portion of the display screen with many user actions instructed to be performed when gems reach the NOW bar. In many embodiments, the music track is rendered partially transparent so that the portions of the game scene underlying the music track can still be perceived. The partial transparency may be accomplished by, for example, alpha blending the music track with the underlying game scene. Accordingly, the music track may include an alpha channel indicating the relative display intensities of the music track and the game scene. The process then continues to block 415.

In block 415, user inputs are processed. Input from the user can be received from the game controller of FIG. 2 or some other input, for example, a microphone. Inputs from the user are commonly signaled electrically although the type of physical action taken by the user varies with the particular type of game. For example, the user can provide inputs by performing a strumming action on a guitar controller. The process then continues to block 417.

In block 417, the process checks if the game has finished. Finishing can be based on determining if there are any remaining video and instructive cues, user inputs have been received and processed, and time elapsed since displaying video and instructive cues. If there are no video and instructive cues remaining and inputs have been received or a certain time has elapsed, the process continues to block 419. Otherwise, the process returns to block 413.

In block 419, the results are transmitted to a server. The results can be the score and performance level of the user displayed to the user and/or other information related to game play. Once results have been transmitted the process returns.

Figure 5:
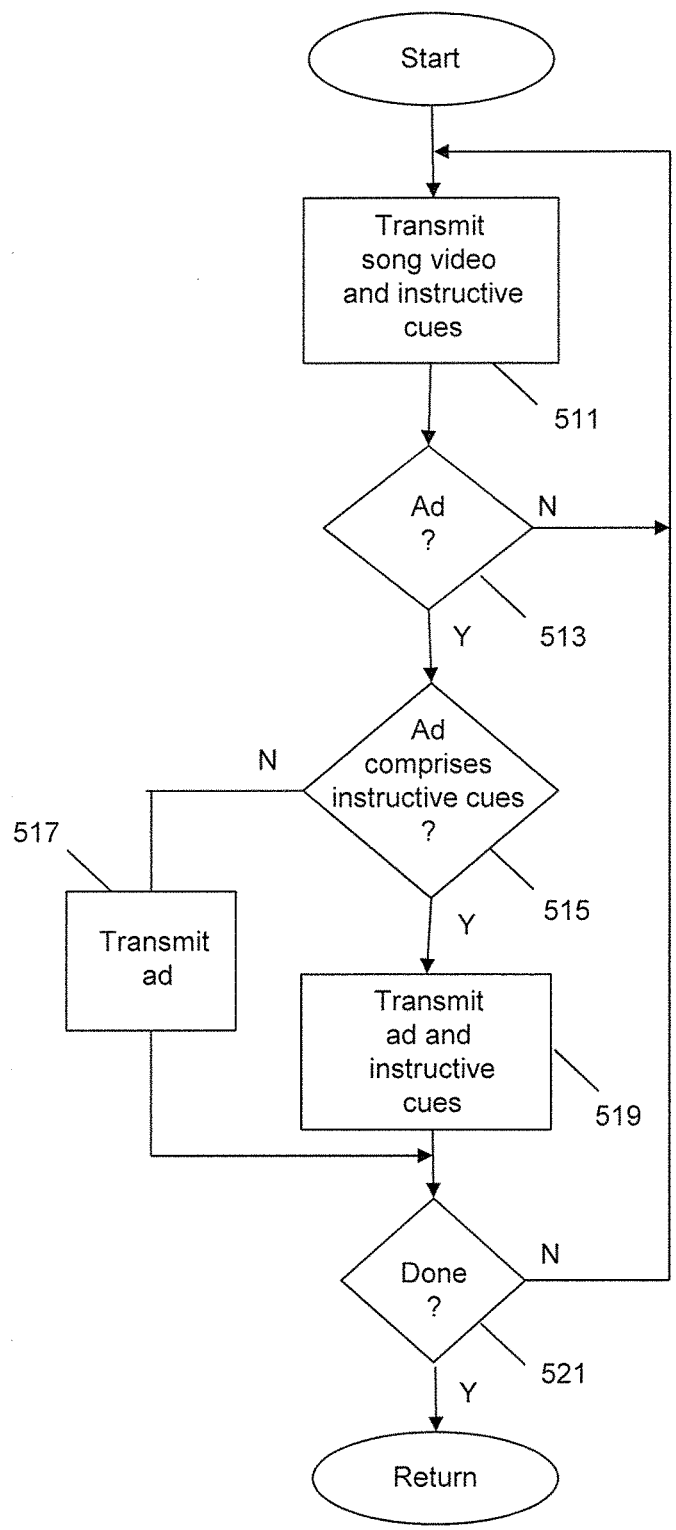
FIG. 5 is a flowchart of a process for providing a program including advertisements in accordance with aspects of the invention.

FIG. 5 is a flowchart of an embodiment of a process for providing a program including advertisements in accordance with aspects of the disclosure. In some embodiments, the process is performed by a server, for example, the server of FIG. 1 or a processor of the server. Program instructions for the process may be stored on an optical disc or another computer-readable medium. Although the process is described in the context of a music-based video game, one of ordinary skill will recognize that the teachings of the process may be applied to other video game genres in which gameplay instructions are delivered and user inputs received in a continuous loop until the gameplay instructions and/or advertisement are completed.

In block 511, the process transmits audio and video for a song, and instructive cues for the song. During the transmission of block 511, the process can be interrupted by an advertisement as will be described in block 513.

In block 513, in one embodiment, the process transmits an advertisement, for example, to a game device. The advertisement may be a commercial offering for a product and/or service. For example, the advertisement may relate to a third-party product and/or service or an in-game product and/or service. Alternatively, the advertisement may be a commercial offering relating to the video game's program information (e.g., currently playing or upcoming songs, broadcasts, or other in-game content or in-game items). In some embodiments advertisements are transmitted upon completion of 2 or 3 songs, for example, so as to be transmitted at times expected to alleviate player fatigue during gameplay. As songs may often be on the order of three to four minutes, in some embodiments advertisements are transmitted every six to twelve minutes.

In some embodiments, the advertisement may be a promotional message relating to a particular player or group of players. For example, after a player completes a certain song, the process may transmit promotional message relating to the player's achievement (e.g., a congratulatory message for completing the song or for beating a previous high score, a leaderboard for the completed song, or a message about the number of other players participating in the programming). In some embodiments, the process transmits advertisements that are a mix of commercial offerings and promotional messages about one or more players.

In some embodiments, the advertisement to a particular player may be based on information relating to the player. Information relating to the player may comprise, for example, information about the player's game play (e.g., experience level, most/least played game modes, playing times, achievements, etc.), information about the player's preferences (e.g., favorite songs, artists, programming, etc.), information about the player's demographics or geographic location, information about the player's social network and/or rivals, and/or any other information about the player. For example, an advertisement may feature the player's favorite musical group and/or programming relating to preferred musical genres.

The process may transmit the advertisement to all players or a subset of players. In some embodiments, for example, promotional messages about a particular player may be sent to other players within the particular player's social network or rivals of the particular player. The advertisement can be any length of time and can include a complete song, a portion of a song, or no music. The advertisement may be presented at any time relative to the presentation of the song (i.e., before, during, or after). In some embodiments, the advertisements are presented at regular predefined intervals to avoid player fatigue relating to game play. The advertisement can be streamed to the game device such that the advertisement may commence presentation on the game device while the game device is still receiving portions of the advertisement. Alternatively, the advertisement may be transmitted to and stored on the game device before playback. If there is no advertisement to be transmitted, then the process returns to block 511, and game play resumes. If there is an advertisement to be transmitted, the process checks if there are instructive cues associated with the advertisement. If there are no instructive cues associated with the advertisement, the process continues to block 517. If there are instructive cues associated with the advertisements, the process continues to block 519.

In block 517, the process transmits the advertisement to the game device and/or the user. The advertisement, which may comprise audio and/or video, can be presented through the game device's audio/video outputs. When the advertisement's presentation has finished, the process continues to block 521. In some embodiments, the advertisement's presentation can be terminated prior to the completion of the advertisement. For example, the user may provide input terminating presentation of the advertisement. In some embodiments, the user may purchase or earn the ability to terminate presentation of the advertisement. In some embodiments, the user may purchase or earn the ability to consume video game content free of advertisements.

In block 519, the process transmits the advertisement with video, audio, and instructive cues. The transmitted information allows, in some embodiments, the advertisement to be playable as a game. Game play of the advertisement can be similar to game play of a song, for example as discussed with respect to FIG. 4. In some embodiments, the process receives from the user input that determines whether the advertisement is presented as a playable advertisement. For example, the process may provide an indication (e.g., a textual, visual, audio, or other indication) that the advertisement is playable as a game. The process may then receive user input requesting to play the advertisement as a game (e.g., presentation of the instructive cues and scoring of the user's compliance with the instructive cues as described in FIG. 4). The process then continues to block 521.

In block 521, the process checks if the program has finished. Finishing can be based, for example, on the elapsed time since the program started, on the completion of transmission of information relating to one or more songs and advertisements, or other events. If the program has finished, the process returns; otherwise, the process returns to block 511.

Figure 6:
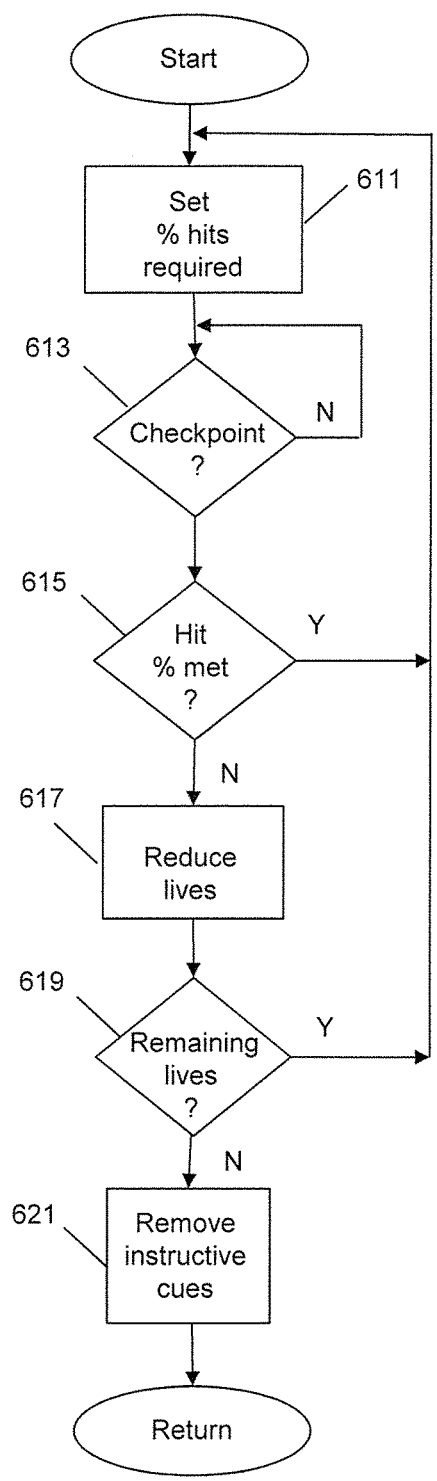
FIG. 6 is a flowchart of a process for modifying user success requirements during video game play in accordance with aspects of the invention.

FIG. 6 is a flow diagram of a process for modifying user success requirements during video game play in accordance with aspects of the invention. In some embodiments, the process is performed by a game device, for example a game device as discussed with respect to FIG. 1, or a processor of a game device.

In block 611, the process sets a performance criteria for a user. In the context of a music-based video game in which a user is to perform actions in compliance with instructive cues, for example, the criteria may be that the user must successfully comply with a particular fraction, or percent, of the instructive cues presented to the user during play of the song. Alternatively or additionally, the criteria may be related to the user's score, the number of consecutive instructive cues successfully performed by the user, the degree or duration of a bonus earned by the user, or any other criteria relating to the performance of the user. In the context of a music-based video game, play of the music-based video game may be termed play of the song. In some embodiments, the criteria may be set based on predefined values. For example, at a beginning of a song the criteria may be set to a first value, and later in the song the criteria may be set to a second value, with the second value greater than the first value. Similarly, over the course of a program comprising a plurality of songs, the criteria may be set to ever increasing values. Alternatively, the criteria may be set based on the past performance of users who have played the song, or the performance of users currently playing the song. In some embodiments, the criteria may be set based on values provided to a game device by a server, with the server in some embodiments receiving information as to the success, or lack thereof, of a plurality of users who have played or are playing the song. For example, in some embodiments, game devices providing for user play of the song may periodically or aperiodically report performance of the user to the server, and the server may dynamically command the game device to vary the performance criteria. The server may vary the performance criteria as discussed above, or based on other factors.

In block 613, the process determines if a checkpoint has been reached in game play. In some embodiments, the process determines that a checkpoint has been reached on a periodic basis, for example every 30 seconds during game play. In some embodiments, the process determines that a checkpoint has been reached if game play has occurred for predefined periods of time. For example, a checkpoints may be defined to occur at 30 seconds into game play, 45 seconds into game play, 90 seconds into game play, and 3 minutes into game play. In some embodiments, the process determines that a checkpoint has been reached based on checkpoint information provided by a server to a game device. In some embodiments, the checkpoint information may be provided along with video game content, with the checkpoint information indicating times during game play at which a checkpoint occurs. For example, the checkpoint information may indicate predefined times at which checkpoints occur, and the predefined time may in some embodiments correspond to percentages of time, or percentages of instructive cues or percentages of particular instructive cues, of or associated with a song. In many embodiments the checkpoint information is common to a particular song, such that checkpoint occurrence is the same for all users playing the particular song. In some embodiments, the checkpoint information is common to a particular song for a particular program, or series of songs. For example, in some embodiments, the particular song may have a first set of checkpoints defined when the song is played outside the framework of a program, or for a first set of programs, but have a second set of different checkpoints defined when the song is played in the framework of a particular program, or a second different set of programs. In some embodiments, checkpoints may relate to the song's musical structure or form. For example, checkpoints may be set at the beginning or end of one or more of the song's introduction, verses, choruses, bridges, conclusion, etc.

If the process determines that a checkpoint has been reached in game play, the process continues to block 615. In block 615, the process determines if a user playing the game has met the performance criteria set in block 611. In most embodiments, the user playing the game is the user playing the game on a specific game device, which in many embodiments is the game device performing the process. In many embodiments, the process also provides information as to whether the user has met, or not met, the performance criteria to a server. In some embodiments, the process determines if the performance criteria has been met by a plurality of users playing the game on different game devices, for example if a server is performing the process or parts of the process, in which case the server may be provided information, for example, as to extent of compliance of the various users with the instructive cues.

In some embodiments, when a checkpoint has been reached in game play, the process transmits to a user information relating to other users. For example, the process may transmit to a user information relating one or more other users' performance(s) of the criteria (e.g., whether one or more other users have met the performance criteria, the degree to which one or more other users have met the performance criteria, identification information relating to the one or more other users, etc.). In some embodiments, the process may display the received information relating to other users. For example, when a user reaches a checkpoint, the process may display to the user information relating to one or more other users' performance of the criteria. In some embodiments, the process may determine one or more users out of a group of users participating in a game play of a song or program that has the highest performance of the criteria at a given checkpoint and award the one or more users with the highest performance a secondary score. The user(s) with the highest secondary score at the end of game play (e.g., end of a song and/or program) may be awarded a secondary bonus or be considered the winner of the song and/or program.

If the performance criteria has been met, the process returns to block 611 and sets a new performance criteria. If the performance criteria has not been met, the process in block 617 modifies a feature related to game play. For example, in some embodiments, of game play, a user may have a predefined number of "lives," which may be required to be greater than zero for the user to continue participating in game play. In such embodiments the process may reduce the number of "lives" available, for example by decrementing the lives by one. In other embodiments, the process may take some other action that has a negative effect on the user or the user's ability to successfully continue game play, for example reducing credits available to the user or making predefined game features, for example a bonus mode, unavailable to the user. In some other embodiments, the process may take some other action that has a positive effect on the user or the user's ability to successfully continue game play, for example decreasing difficulty of game play of the song being played by the user.

In block 619, the process determines if the user may continue with game play. For example if the process has reduced the number of lives available to the user in bock 617, the process may determine if the user has any remaining lives. If the user does have remaining lives, the process returns to block 611 and sets a new performance criteria. If not, the process continues to block 621 and ceases displaying instructive cues to the user, and in most embodiments ceases determining if the user has complied with instructive cues associated with the song being played. In many embodiments, however, the process continues presenting, or commanding presentation of, audio and video associated with the song, for example so that the user may continue to enjoy presentation of the song.

The process thereafter returns.

Figure 7:
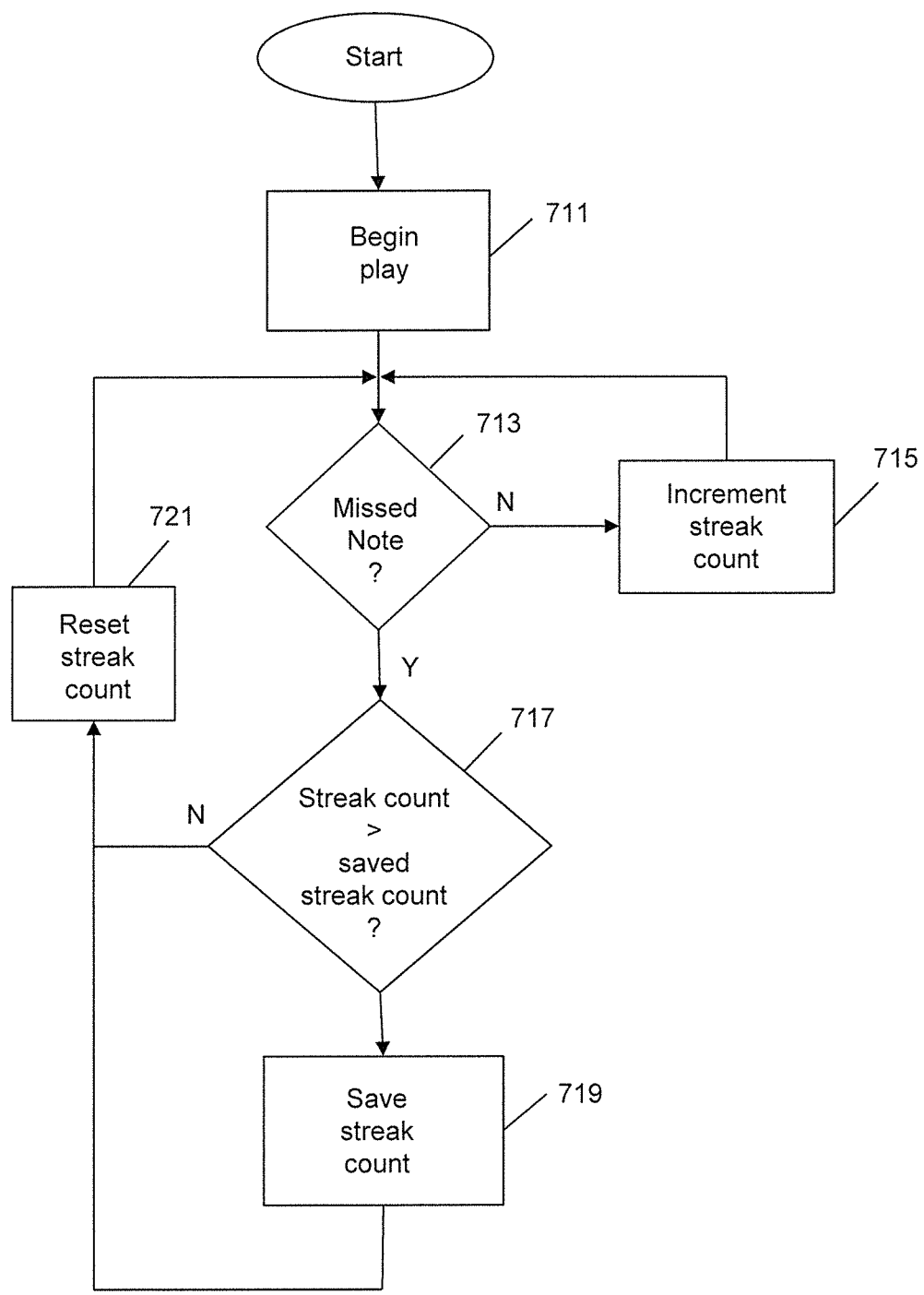
FIG. 7 is a flowchart of a process for determining user success continuity during video game play in accordance with aspects of the invention.

FIG. 7 is a flow diagram of a process for determining a user success indicator parameter during video game play in accordance with aspects of the invention. In some embodiments, the process is performed by a game device, for example a game device as discussed with respect to FIG. 1, or a processor of a game device.

In block 711, the process begins providing for video game play. In some embodiments, video game play is play of a music-based video game. In some embodiments, instructive cues are presented to a user, who is to operate a game controller so as to comply with the instructive cues. In some embodiments, the instructive cues are associated with a song, with audio of the song and video associated with the song also presented to the user, such that the user may be considered to be playing the song during game play. In some embodiments, video game play is as discussed, for example, with respect to the process of FIG. 4. Generally, the process provides for game play generally continuously during operation of the process of FIG. 7.

In block 713, the process determines if the user has failed to comply with an instructive cue. In many embodiments the instructive cues may represent musical notes to be effectively played by the user, by way of operation of the game controller, and failure to comply with the instructive cue may be considered as equivalent to the user missing a note during play of the song.

If the user did not miss the note, in block 715 the process increments a current streak count and the process continues with game play and returns to block 713. The streak count in many embodiments may be considered an indication of a number of times the user has consecutively successfully complied with the instructive cues. In some embodiments, the user can purchase an option or right to increase a streak count by a predefined number, or in some embodiments to have the streak count incremented by a value greater than would otherwise be indicated by successful play of a note.

In some embodiments, streak counts are unique to a particular instance of particular play of a particular song, such that during a single play of the song a maximum streak count is determined. In other instances streak counts are unique to play of a particular song, regardless of a number of times a user plays the particular song. In some embodiments, streak counts are unique to a particular program, or play of a predefined series of songs.

In some embodiments, the user may "bank" a current streak count by providing input to the process (e.g., a button press, mouse click, motion-based gesture, or any other input). When the process receives an indication that the user is banking the current streak count, the process adds the current streak count to an accumulated streak count and restarts the current streak count to zero. In some embodiments, the user may only bank a predefined number of streak counts to the accumulated streak count in a given time period (e.g., the user may bank the current streak count 2, 3, or 5 times during a given song, sequence of songs, and/or time frame).

If the user did miss the note, in block 717 the process determines if the streak count is greater than a previously saved streak count. If so, the process saves the streak count as a saved streak count in block 719, resets the current streak count in block 721, and the process continues with game play and returns to block 713.

Figure 8:
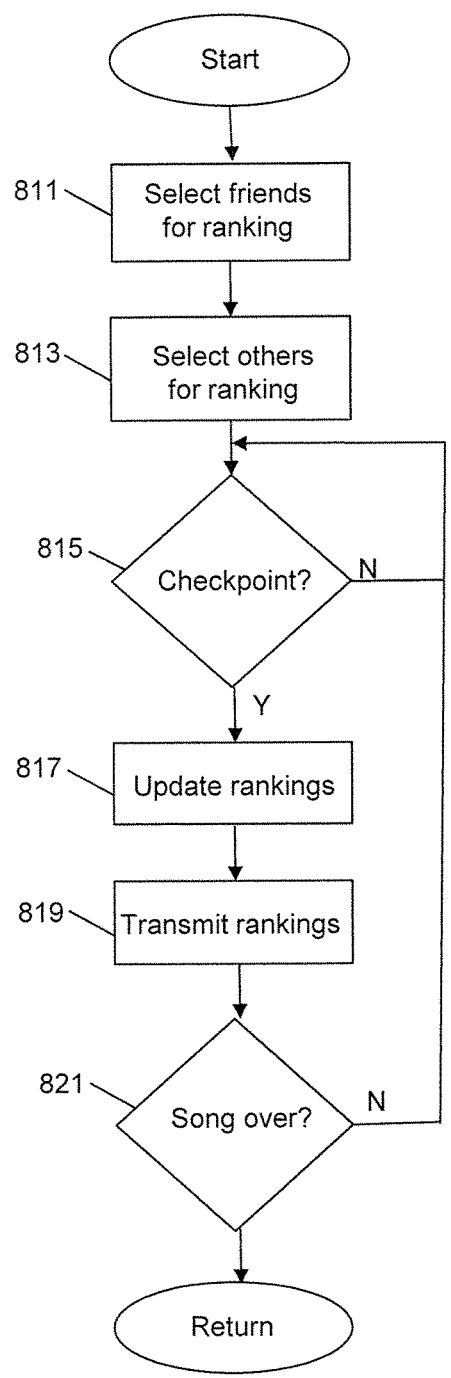
FIG. 8 is a flowchart of a process for generating filtered user rankings during video game play of a program.

FIG. 8 is a flowchart of an embodiment of a process for providing rankings of users with respect to play of a video game. In some embodiments, the process is performed by a server, for example, the server of FIG. 1 or a processor of the server.

In various embodiments, the process determines a set of users to rank, one or more criteria by which the set of users is to be ranked, ranks the users, and transmits an indication of the ranking to a game device or game devices associated with one, some, or all of the ranked users. In some embodiments, the set of users includes all users who have played a particular video game, or portion of a particular video game. In some embodiments, the set of users includes only users who are indicated to have an association with a particular user, for example users who are indicated as friends (or rivals) of the particular user. In some embodiments, for example embodiments in which hundreds or thousands of users may play a video game, the set of users includes only users that are estimated to have similar game play skill to the particular user, for example as indicated by past video game scores or other video game achievements. In some embodiments, ranking occurs during play of a video game, and/or in some embodiments, ranking occurs after play of the video game. In some embodiments, the video game is a music-based video game.

In the example embodiment of the process indicated by the flowchart of FIG. 8, in block 811 the process selects friends of a particular user as users to be included in a ranking. In some embodiments, the process determines friends of the particular user by receiving a list of friends from the user. In some embodiments, the video game comprises a social networking component that allows the user to establish friend relationships with other users of the video game. In some embodiments, the process determines friends of the particular user by receiving an indication of friends of the user from another software application, for example an independent social networking application available over the Internet. In some embodiments, the process further filters the friends of the particular user to those users who have played a particular song of the music-based video game, or who have indicated that they will play the particular song substantially simultaneously with the particular user (for example as part of a timed program as discussed herein).

In block 813, the process additionally selects other users for ranking. In some embodiments, the process selects other users that have previously been ranked against the particular user. In some embodiments, the process selects other users expected to be of similar skill to the particular user.

In some embodiments, the process may prioritize various groups of users in selecting one or more users to rank against a particular user. For example, in some embodiments, the process may first determine whether the user's friends are currently playing the same video game or portion thereof (in the example of a music-based video game, for example, the same song and/or program). If so, the process selects one or more of these friends for ranking. If none of the user's friends are currently playing the video game, the process may then select (non-friend) users who are currently playing the same video game or portion thereof for ranking. In some embodiments, the process prioritizes those (non-friend) users who are expected to be of similar skill to the particular user (e.g., the (non-friend) users' past scores are within a certain threshold range of the particular user's past scores). If no friend or non-friend users are currently playing the same video game or portion thereof, then the process proceeds to rank the user against one or more past performances of friend or non-friend users who have played the same video game or portion thereof (i.e., asynchronous competition). In some embodiments, the process prioritizes past performances of friends over non-friend users.

In block 815, the process determines if rankings should be updated. For example, and as illustrated in FIG. 8, the process may determine that rankings should be updated if the process has received an indication that a checkpoint in a song has been reached, for example as discussed with respect to the process of FIG. 6.

In block 817, the process updates rankings. In some embodiments, the process ranks each user in the set of users to rank in a sequential list. For example, the users may be ranked in sequential order in terms of video game scores associated with the users at the time of updating of the rankings. Other metrics, for example highest streak counts, may instead or in addition be used for the rankings. In some embodiments, the process also formats information for display of the rankings. For example, the rankings may list users in sequential order, with the list arranged in some embodiments, in totem pole fashion. In some embodiments, the users other than the particular user may be in a first list arranged in sequential order, with the particular user placed in appropriate position to the side of the list, to highlight position of the particular user.

In block 819, the process transmits the ranking information to various game devices. The game devices may thereafter display the rankings to users.

In the example embodiment of FIG. 8, the process determines rankings during play of a song (and at the end, if a checkpoint is so defined). Accordingly, in block 821 the process determines if play of the song is complete. If not, the process goes to block 815 to await a further checkpoint. Otherwise the process returns.

Figure 9:
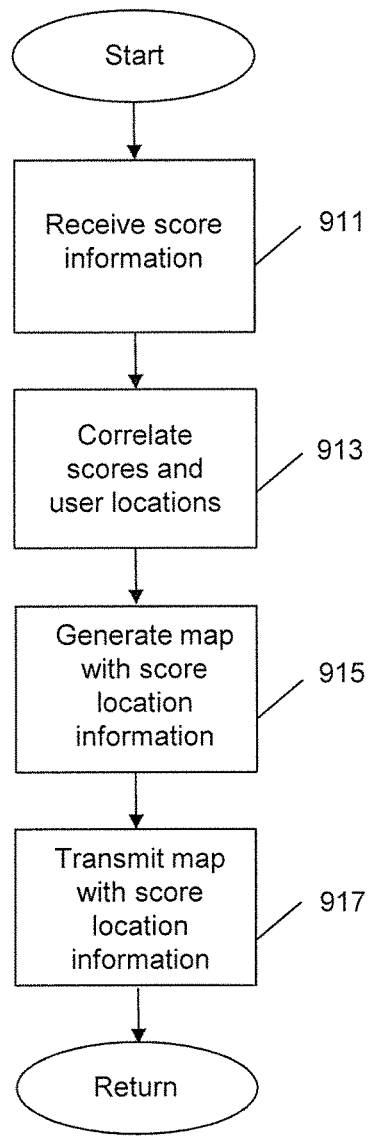
FIG. 9 is a flowchart of a process for generating location information regarding users participating in video game play of a program.

FIG. 9 is a flowchart of an embodiment of a process for providing user location related information with respect to play of a video game. In some embodiments, the process is performed by a server, for example, the server of FIG. 1 or a processor of the server.

In block 911, the process receives information related to user video game play of a video game and user location. The information includes information indicating user location, or from which an estimate of user location may be derived. For example, in some embodiments, the information includes an indication of identity of users, with the process already having location information for the users. Also for example, in some embodiments, the information includes IP addresses and/or similar information regarding users, from which an estimate of user location may be derived. In some embodiments, and as indicated in FIG. 9, the information includes video game play score information. The score information may be, for example, scores users have achieved in play of a particular video game or portion of a video game. For example, for a music-based video game the information may be scores of users who have played a particular song of the music-based video game. In various embodiments, the information may instead include other video game play related information, for example streak count information or other information. In some embodiments, the information may relate to a particular song, or a particular series of songs.

In block 913, the process correlates the video game play related information and user locations.

Figure 10:
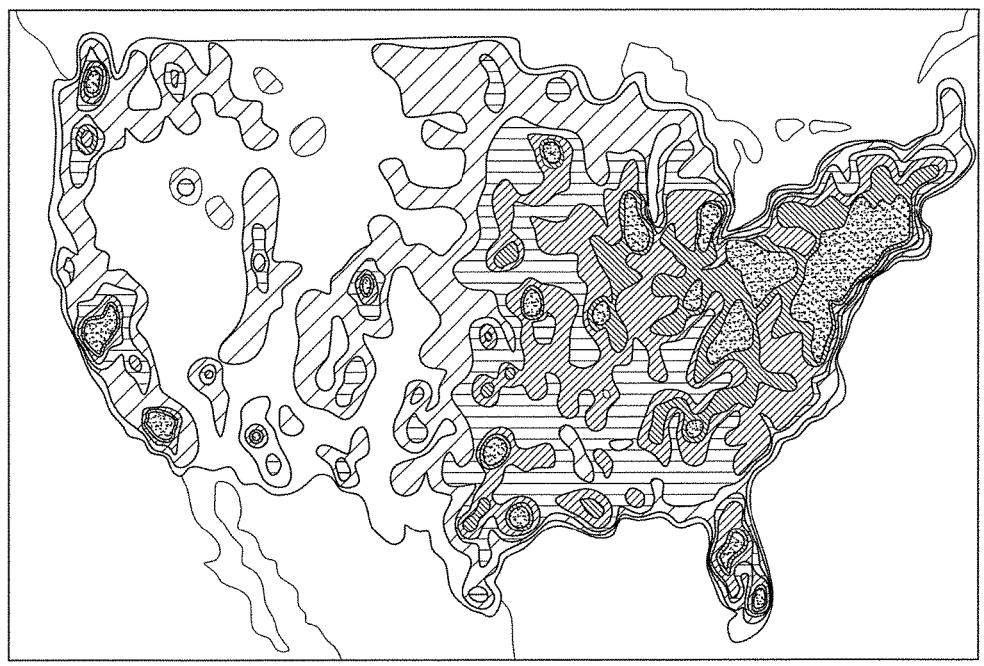
FIG. 10 illustrates a sample display for location information regarding users participating in video game play of a program.

In block 915, the process generates map information with video game play related information, for example score information. FIG. 10 illustrates a sample display of map information with score information. In the map of FIG. 10, which may be considered a heat map, a geographic region including the United States is shown, with varying colors, or shades of colors, indicative of locations of higher and lower scores of users who have played a particular song of a music-based video game.

In block 917, the process transmits the map information with video game play related information to game devices, for example for display to users.

The process thereafter returns.

Figure 11:
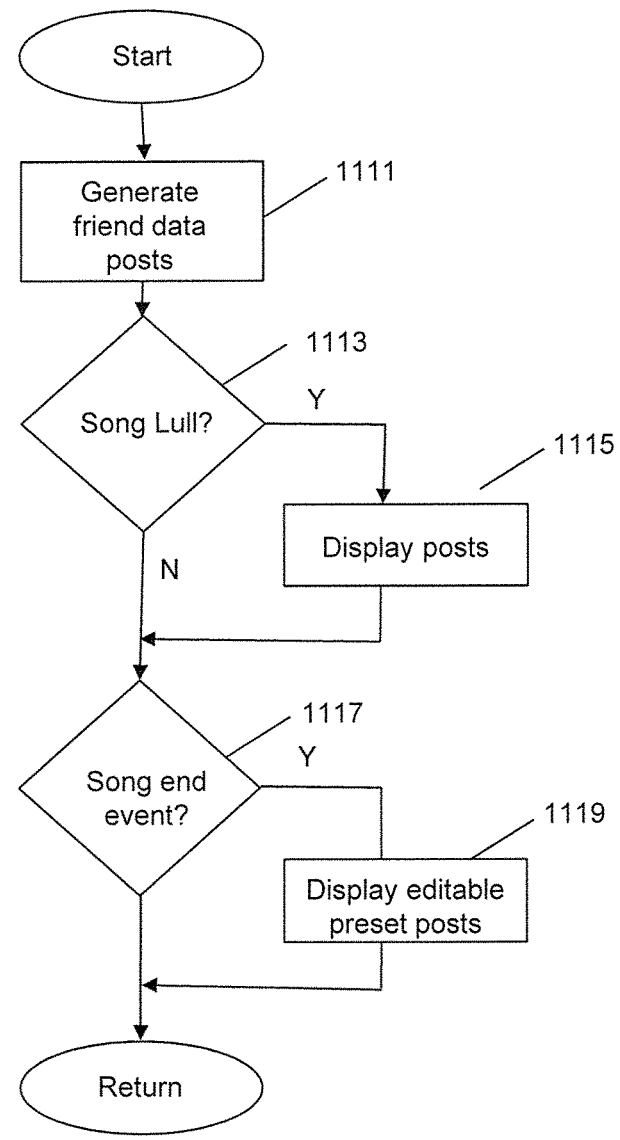
FIG. 11 is a flowchart of a process for posting messages and information relating to users participating in video game play of a program.

FIG. 11 is a flowchart of an embodiment of a process for posting messages and information relating to users participating in video game play. In some embodiments, the process is performed by a game device, for example, the game device of FIG. 1 or a processor of the game device.

In block 1111, the process generates sample posts for transmission, by a particular user using the game device, to other users or other individuals, for example by transmission to a social networking application. In block 1111, in some embodiments, the process also gathers posts generated by other users or individuals, for example users and individuals who have been previously identified as a friend of the particular user or who have otherwise indicated that the particular user may receive their posts.

In block 1113, the process determines if a lull in a song of a music-based video game being played by the particular user has occurred. A lull may occur, for example, if there is predefined duration of time within play of the song during which the user need not comply with instructive cues. The predefined duration of time may be in various embodiments, for example, 3 seconds, or 5 seconds, or some other duration of time.

If there is a lull in the song, in block 1115 the process displays, or commands display of, posts from friends of the user. The posts may, for example, be posts gathered in block 1111 of the process. In some embodiments, the process removes display of the posts upon conclusion of the lull in the song. In some embodiments, the process continues to display the posts throughout play of the song, unless, in some embodiments, the posts are later superseded by other posts.

In block 1117, the process determines if a song end event has occurred. A song end event may be that play of a particular song has been completed, for example due to the user successfully completing the song, due to the user failing to complete the song, or that play of the song has otherwise concluded.

If a song end event has occurred, in block 1119 the process displays sample posts for transmission by the user. In some embodiments, the sample posts are displayed based on a response to a question posed to the user upon the song end event. In some embodiments, the sample posts are editable by the user prior to transmission. Generally, the process also displays a selectable option allowing the user to transmit the sample posts, with our without edits, and the process transmits the posts upon selection of the option. The process thereafter returns.

Although the invention has been discussed with respect to various embodiments, it should be recognized that the invention comprises the novel and non-obvious claims supported by this disclosure.

What is claimed is:

1. A method for providing a user-generated video game program in a music-based video game, comprising:
   receiving an ordered sequential list of a plurality of user selected songs from a user using a game device;
   processing the received information to create a video game program based on the received information, the video game program comprising the plurality of user selected songs, the video game program including instructive cues for the songs;
   determining that the created video game program may be transmitted to a plurality of game devices,
   wherein the determining that the created video game program may be transmitted to a plurality of game devices is based on receipt of a payment from the user; and
   transmitting the created video game program to the plurality of game devices.

2. The method of claim 1, further comprising receiving information identifying the plurality of game devices.

3. The method of claim 2, wherein the information identifying the plurality of game devices is received from the user.

4. The method of claim 2, wherein the information identifying the plurality of game devices comprises information identifying users associated with the plurality of game devices.

5. The method of claim 4, further comprising determining if users associated with the plurality of game devices has met a performance criteria at predetermined checkpoints during the selected songs.

6. The method of claim 1, wherein the video game program further comprises a plurality of advertisements, at least some of the advertisements relating to a particular player.

* * * * *